United States Patent
Murphy et al.

(10) Patent No.: US 7,233,852 B2
(45) Date of Patent: Jun. 19, 2007

(54) METHOD OF DISTINGUISHING BETWEEN ADULT AND CINCHED CAR SEAT OCCUPANTS OF A VEHICLE SEAT

(75) Inventors: Morgan D. Murphy, Kokomo, IN (US); Raymundo Prieto, Kokomo, IN (US); Steven J. Wagner, Greentown, IN (US)

(73) Assignee: Delphi Technologies, Inc., Troy, MI (US)

( * ) Notice: Subject to any disclaimer, the term of this patent is extended or adjusted under 35 U.S.C. 154(b) by 230 days.

(21) Appl. No.: 11/123,419

(22) Filed: May 6, 2005

(65) Prior Publication Data
US 2006/0253238 A1 Nov. 9, 2006

(51) Int. Cl.
*B60R 22/00* (2006.01)
(52) U.S. Cl. .......................... 701/45; 180/282
(58) Field of Classification Search .................. 701/45, 701/46, 47; 180/271, 282; 280/734, 735
See application file for complete search history.

(56) References Cited

U.S. PATENT DOCUMENTS

| | | | |
|---|---|---|---|
| 5,711,574 A | * | 1/1998 | Barnes .................. 297/216.11 |
| 6,246,936 B1 | | 6/2001 | Murphy et al. |
| 6,364,352 B1 | | 4/2002 | Norton |
| 6,542,802 B2 | | 4/2003 | Gray et al. |
| 2003/0004628 A1 | | 1/2003 | Rennaker et al. |
| 2003/0149517 A1 | | 8/2003 | Murphy et al. |
| 2003/0233198 A1 | | 12/2003 | Taguchi et al. |
| 2004/0215424 A1 | | 10/2004 | Taguchi et al. |

FOREIGN PATENT DOCUMENTS

| | | |
|---|---|---|
| EP | 1356999 | 10/2003 |
| EP | 1452400 | 9/2004 |

* cited by examiner

*Primary Examiner*—Richard M. Camby
(74) *Attorney, Agent, or Firm*—Jimmy L. Funke

(57) ABSTRACT

A normally seated adult occupant of a vehicle seat is distinguished from a cinched car seat occupant based on the static seat force and first and second sets of identified dynamic characteristics that are respectively correlative of a normally seated adult and a cinched car seat. Confidence levels are assigned to the static seat force and each of the identified dynamic characteristics, and overall confidence levels for the two classifications are determined based on the assigned confidence levels. The overall confidence level for the adult occupant classification is compared with the overall confidence level for the cinched car seat classification, and the occupant is classified based on the highest overall confidence level.

11 Claims, 3 Drawing Sheets

METHOD OF DISTINGUISHING BETWEEN ADULT AND CINCHED CAR SEAT OCCUPANTS OF A VEHICLE SEAT

TECHNICAL FIELD

The present invention relates to a method of classifying the occupant of a motor vehicle based on measured parameters including vertical (z-axis) acceleration and occupant weight, and more particularly to a method of distinguishing a cinched car seat from a normally seated occupant of similar apparent weight.

BACKGROUND OF THE INVENTION

The occupant of a vehicle equipped with pyrotechnically deployed restraints must be reliably classified in order to determine whether (and how forcefully) the restraints should be deployed when a crash occurs. For example, it is generally desired to enable deployment for a normally seated adult occupant, and to disable deployment in the case of an infant or child car seat that is placed on the vehicle seat and cinched down with a seat belt. In systems where the occupant is classified based on a measure of the force applied to the seat, it can be difficult to reliably distinguish between a normally seated adult and a tightly cinched car seat, as both apply similar seat force.

One way of distinguishing between a normally seated adult and a cinched car seat is to analyze the dynamic characteristics of the seat force and other correlative dynamic parameters such as z-axis vehicle acceleration. See, for example, the U.S. Pat. No. 6,246,936 to Murphy et al. and the U.S. Pat. No. 6,542,802 to Gray et al., both of which are assigned to the assignee of the present invention. However, it can be difficult to identify a single characteristic or set of characteristics for reliably distinguishing between a normally seated adult and a cinched car seat under the various operating conditions a vehicle might encounter. In practice, there are typically several possible dynamic characteristics that are correlative of a given occupant classification, and the degree of correlation for any given characteristic will often vary depending on occupant and vehicle-related conditions. Accordingly, what is needed is an easily implemented way of distinguishing between a normally seated adult and a cinched car seat of similar apparent weight based a number of correlative dynamic characteristics for the two classifications.

SUMMARY OF THE INVENTION

The present invention is directed to an improved method of classifying a vehicle occupant that reliably distinguishes between a normally seated adult and a tightly cinched car seat, based on static seat force and first and second sets of identified dynamic characteristics that are respectively correlative of a normally seated adult and a cinched car seat. Confidence levels are assigned to the static seat force and each of the identified dynamic characteristics, and overall confidence levels for the two classifications are determined based on the assigned confidence levels. The overall confidence level for the adult occupant classification is compared with the overall confidence level for the cinched car seat classification, and the occupant is classified based on the highest overall confidence level.

In a preferred embodiment, the confidence levels are assigned by computing Mahalanobis distances for the static seat force and the identified dynamic characteristics. In a first alternate embodiment, the confidence levels are assigned by computing a probability distribution function; and in a second alternate embodiment, the confidence levels are assigned by computing a quality loss function.

DESCRIPTION OF THE PREFERRED EMBODIMENT

The present invention is disclosed in the context of a restraint system for an occupant of a vehicle passenger seat 10, where the force applied to the seat 10 by an occupant is determined by measuring the pressure in a fluid-filled bladder 12 disposed under the seat cushion 16. A representative system of this type is shown and described, for example, in the aforementioned U.S. Pat. No. 6,542,802 to Gray et al., issued on Apr. 1, 2003, and incorporated by reference herein. In general, however, the method of the present invention applies to systems utilizing different types of seat force sensors, such as resistive or capacitive sensors, or seat frame strain sensors, for example.

Figure 1:
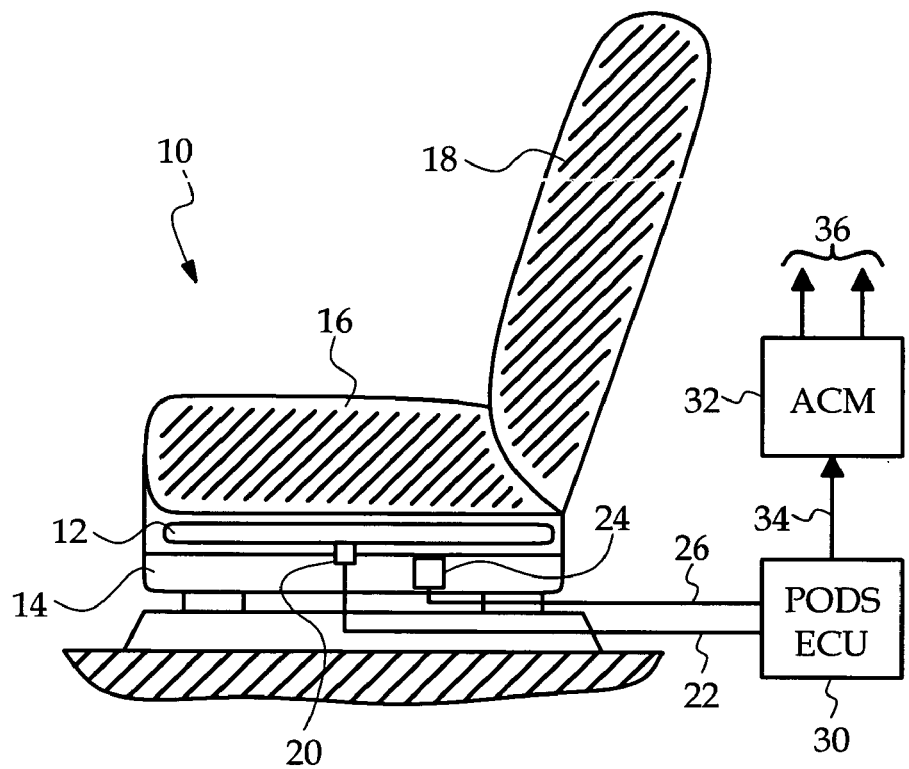
FIG. 1 is a diagram of a vehicle seat and an occupant classification system including a seat force sensor, a z-axis acceleration sensor and a microprocessor-based passive occupant detection system electronic control unit (PODS ECU) programmed to carry out the method of this invention.

Referring to FIG. 1, the seat 10 is supported on a frame 14, and includes foam cushions 16 and 18 on the seat bottom and back. The bladder 12 is disposed in or under the foam cushion 16 substantially parallel with the seating surface of seat 10, and preferably contains a fluid such as silicone which is non-corrosive, and not subject to freezing at extreme ambient temperatures. The bladder 12 is coupled to a pressure sensor 20, which provides an electrical output signal on line 22 indicative of the fluid pressure in the bladder 12. An accelerometer 24 mounted on seat frame 14 is oriented to respond to vertical (i.e., z-axis) acceleration of the vehicle in which the seat 10 is installed, and provides an electrical output signal on line 26 indicative of the sensed acceleration. Alternatively, the accelerometer 24 may be mounted on a frame member of the vehicle, if desired, so long as its vertical or z-axis sensing orientation is preserved.

The electrical pressure and acceleration signals on lines 22 and 26 are provided as inputs to a passive occupant detection system electronic control unit (PODS ECU) 30, which in turn, is coupled to an airbag control module (ACM)

32 via line 34. The ACM 32 may be conventional in nature, and operates to deploy one or more airbags or other restraint devices (not shown) for occupant protection based on various crash sensor inputs 36 and occupant characterization data obtained from PODS ECU 30. In general, ACM 32 deploys the restraints if the crash sensor inputs 36 indicate the occurrence of a severe crash, unless the PODS ECU 30 indicates that deployment should be inhibited. Of course, other more sophisticated controls are also possible, such as controlling the deployment force of the restraint devices based on occupant characterization data provided by PODS ECU 30.

In the illustrated embodiment, the primary function of PODS ECU 30 is to classify the seat occupant based on the pressure and acceleration signals provided by the sensors 20 and 24, and to reliably distinguish between a normally seated adult and a car seat placed on the seat 10 and cinched down with a seat belt (not shown). While low seat force can be used to identify a normally seated child occupant, static seat force alone is inadequate to reliably distinguish between a normally seated adult-weight occupant and a cinched car seat, since both can produce similar static seat force. However, there are differences in the dynamic characteristics of a normally seated adult-weight occupant and a cinched car seat. More specifically, we have been able to identify a set of dynamic characteristics that are correlative of a normally seated adult-weight occupant, and a different set of dynamic characteristics that are correlative of a cinched car seat. Some of these dynamic characteristics involve just the seat force input, whereas others involve both the seat force and z-axis acceleration inputs. By way of example, and without any limitation, the following four dynamic characteristics have been found to be highly correlative of a normally seated adult occupant: (1) a ratio of the number of times the seat force exceeds one standard deviation in a given interval to the number of times the z-axis acceleration exceeds one standard deviation in the interval; (2) a seat force power spectrum energy in excess of 10 Hz; (3) a seat force power spectrum energy in the range of 10 Hz–50 Hz; and (4) a ratio of the number of times the seat force exceeds two standard deviations in a given interval to the number of times the z-axis acceleration exceeds two standard deviations in the interval. Conversely, and without any limitation, the following four dynamic characteristics have been found to be highly correlative of a cinched car seat: (1) an integral of the ratio of the dynamic seat force to the z-axis acceleration over a specified interval; (2) the average value of the ratio of the dynamic seat force to the z-axis acceleration; (3) a ratio of dynamic seat force to the z-axis acceleration within a calibrated range; and (4) a dynamic seat force within a calibrated range.

Since the degree of correlation of any parameter with the respective occupant classification tends to vary with the operating conditions of the vehicle and the condition of the road surface upon which it operates, the method of the present invention resolves any ambiguity by determining an overall confidence level for each of the two possible occupant classifications. The confidence levels are determined based on a comparison of the measured characteristics with stored statistical values, and the occupant status is determined on the basis of the occupant classification having the highest overall confidence level.

Figure 2:
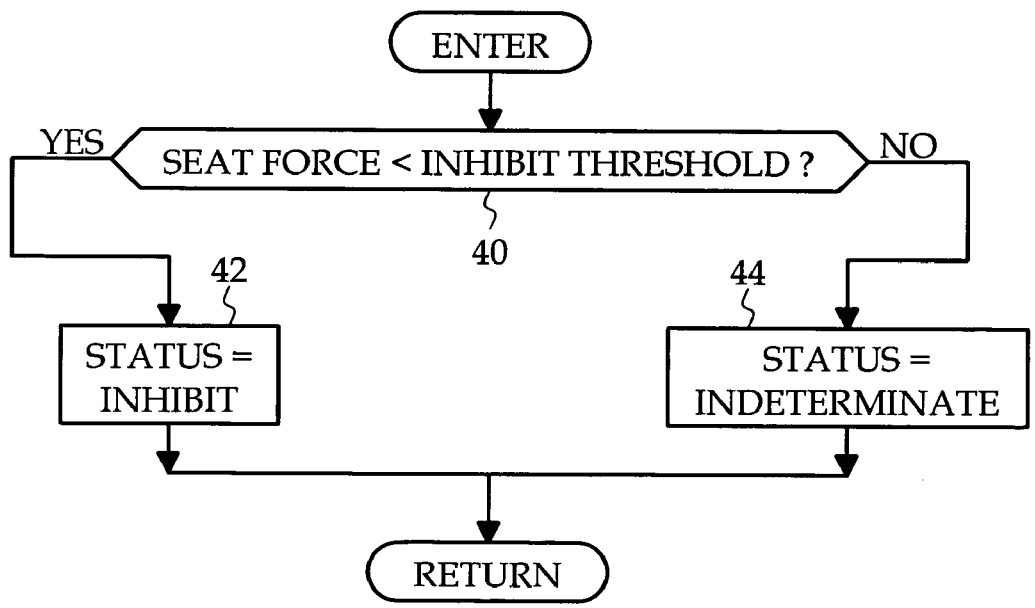
FIG. 2 is a flow diagram representative of a software routine executed by the PODS ECU of FIG. 1 for classifying the occupant based on static seat force.

In general, PODS ECU 30 attempts to initially classify an occupant of seat 10 when the vehicle is at rest based on the static seat force. Referring to the flow diagram of FIG. 2, the block 40 determines if the measured static seat force is less than a calibrated inhibit threshold characteristic of a normally seated child or very light weight adult. If the static seat force is less than the inhibit threshold (but greater than an empty seat threshold), the seat occupant can be reliably classified as a child, and the block 42 is executed to set the deployment status to INHIBIT to prevent air bag deployment. Otherwise, the occupant classification cannot be reliably determined based on static seat force alone, and the block 44 is executed to indicate that the deployment status is indeterminate. If the status is indeterminate, PODS ECU 30 attempts to classify the occupant by additionally determining dynamic characteristics correlative of normally seated adults and cinched car seats when the vehicle is in motion.

Figure 3:
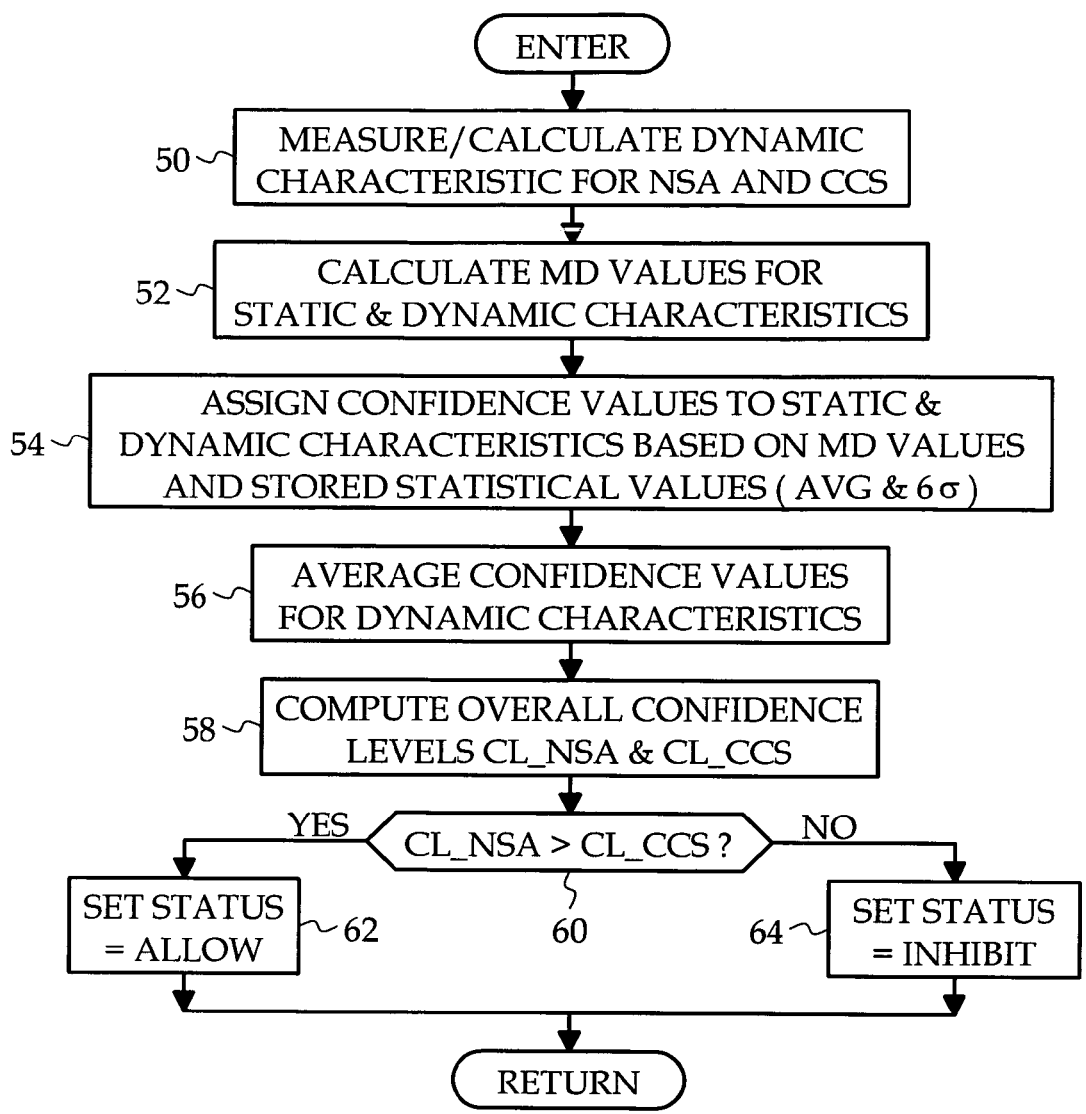
FIG. 3 is a flow diagram representative of a software routine executed by the PODS ECU of FIG. 1 according to the preferred embodiment of this invention when the occupant cannot be classified based solely on static seat force.

The flow diagram of FIG. 3 depicts a method of distinguishing between a normally seated adult and a cinched car seat according to the preferred embodiment of this invention. The flow diagrams of FIGS. 5 and 6 respectively depict first and second alternate methods according to this invention.

Figure 4:
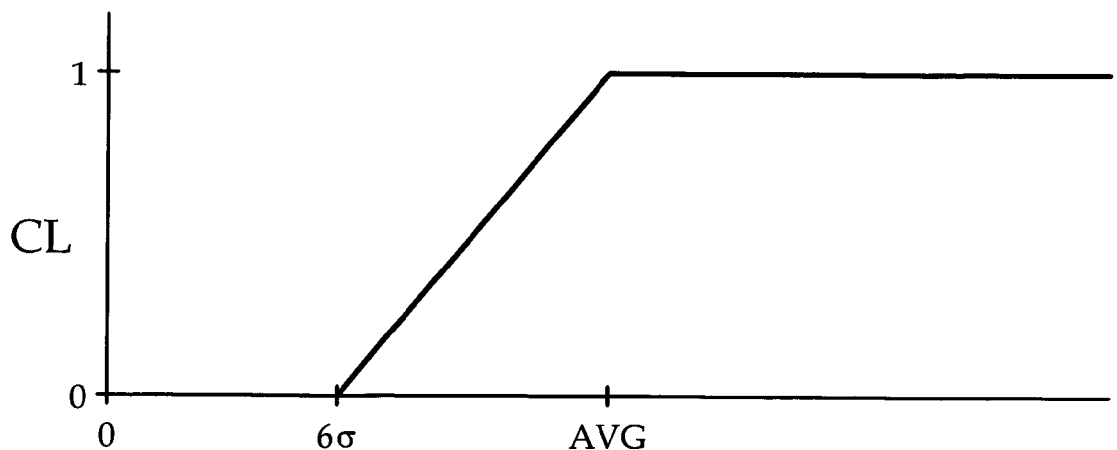
FIG. 4 is a graph depicting an assignment of confidence levels according to the flow diagram of FIG. 3.

Referring to the flow diagram of FIG. 3, the block 50 is first executed to measure and/or calculate the various dynamic characteristics that are correlative of normally seated adults and cinched car seats. The blocks 52 and 54 are then executed to assign confidence levels to the average seat force and each of the dynamic characteristics. In the preferred embodiment, this is achieved by computing Mahalanobis distances for the measured average seat force and the determined dynamic characteristics, first considering an adult occupant as the normal classification, and then considering a cinched car seat as the normal classification. In general, Mahalanobis distance is determined by normalizing the determined value of a characteristic based on stored average and standard deviation values for that characteristic, and computing the Mahalanobis distance based on the normalized value and a stored inverse correlation coefficient. A detailed discussion of Mahalanobis distance computation is given, for example, in the U.S. patent application Publication No. 2003/0233198 A1, incorporated by reference herein. The block 54 assigns confidence values to the measured average seat force and each of the measured dynamic characteristics based on the Mahalanobis distance (MD) values and respective stored average and six-sigma values as graphically depicted in FIG. 4. If the MD value is greater than the stored average value (AVG), the confidence level CL is set to its highest value, one. If the MD value is less than the stored six-sigma value ($6\sigma$), the confidence level CL is set to its lowest value, zero. If the MD value is between AVG and $6\sigma$, the confidence CL is set to an intermediate value as shown in FIG. 4. This can be achieved by table look-up, or mathematically using the following equation:

$$CL=1-[(AVG-MD)/(AVG-6\sigma)]$$

Returning to the flow diagram of FIG. 3, the block 56 determines an average dynamic confidence value (AVG_DYN_CL_NSA) for the dynamic characteristics correlative of a normally seated adult (NSA), and an average dynamic confidence value (AVG_DYN_CL_CCS) for the dynamic characteristics correlative of a cinched car seat (CCS). The block 58 then calculates an overall confidence level (CL_NSA) in favor of a normally seated adult, and an overall confidence level (CL_CCS) in favor of a cinched car seat. This can be done, for example, by taking the square root of the product of the confidence levels for the static and average dynamic characteristics, as given in the following two equations:

$$CL\_NSA = (STATIC\_CL\_NSA * AVG\_DYN\_CL\_NSA)^{1/2}$$

and $$CL\_CCS = (STATIC\_CL\_CCS * AVG\_DYN\_CL\_CCS)^{1/2}$$

where STATIC_CL_NSA is the confidence level in favor of a normally seated adult based on static or average seat force, and STATIC_CL_CCS is the confidence level in favor of a cinched car seat based on static or average seat force. The block 60 compares the overall confidence levels CL_NSA and CL_CCS. If CL_NSA exceeds CL_CCS, the occupant is classified as a normally seated adult, and the block 62 is executed to set the deployment status to ALLOW. Otherwise, the occupant is considered to be a cinched car seat, and the block 64 is executed to set the deployment status to INHIBIT.

Figure 5:
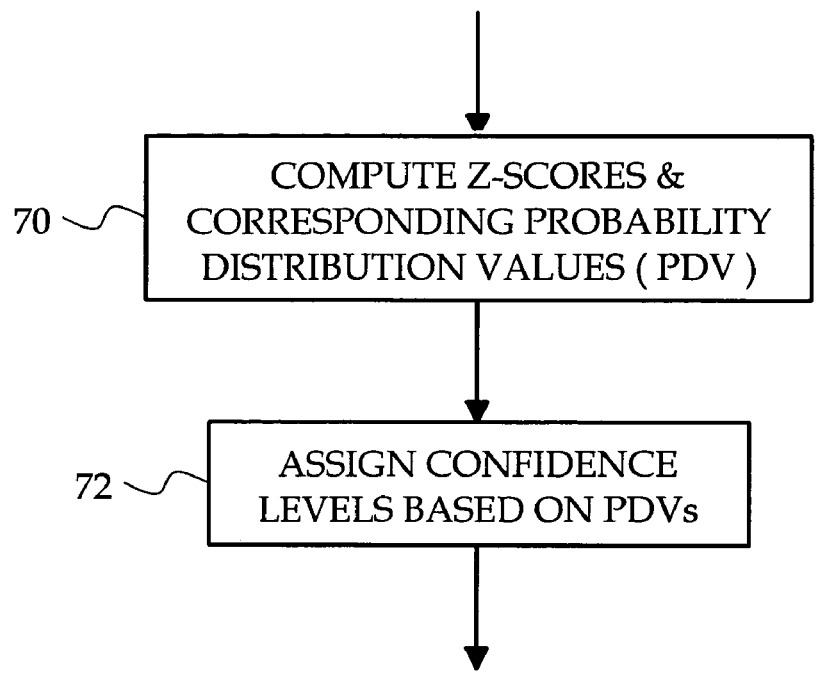
FIG. 5 is a flow diagram representative of a software routine executed by the PODS ECU of FIG. 1 according to a first alternate embodiment of this invention when the occupant cannot be classified based solely on static seat force.

The flow diagram of FIG. 5 depicts a first alternate embodiment where confidence levels are assigned to the static and dynamic characteristics using a probability distribution function. In this case, the blocks 70 and 72 replace the blocks 52 and 54 of FIG. 3. Block 70 computes a z-score for the static (average) seat force and each determined dynamic characteristic, and in each case, a corresponding probability distribution value PDV. The probability distribution values may be determined by table look-up, for example. Block 72 determines confidence levels corresponding to the probability distribution values according to:

$$CL = 1 - [(0.5 - PDV)/0.5]$$

Alternately, the confidence level CL may be determined directly from the z-score by table look-up.

Figure 6:
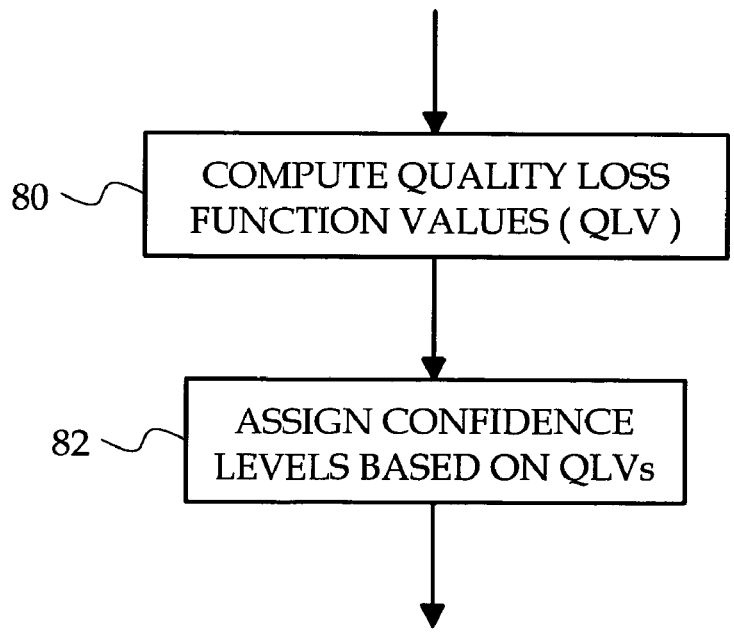
FIG. 6 is a flow diagram representative of a software routine executed by the PODS ECU of FIG. 1 according to a second alternate embodiment of this invention when the occupant cannot be classified based solely on static seat force.

The flow diagram of FIG. 6 depicts a second alternate embodiment where confidence levels are assigned to the static and dynamic characteristics using a quality loss function, which defines a quadratic characterization of deviation from a stored mean value. In this case, the blocks 80 and 82 replace the blocks 52 and 54 of FIG. 3. Block 80 determines a quality loss value QLV for the static seat force and each determined dynamic characteristic based on the stored nominal value and the stored variation, and block 82 determines confidence levels corresponding to the quality loss values according to:

$$CL = 1 - [(OUT - AVG)/(3 * SD)]^2$$

where AVG and SD are stored average and standard deviation values, and the confidence level CL is set to zero when the calculation produces a negative result.

In summary, the method of the present invention provides a way of reliably distinguishing between adult and cinched car seat occupants of similar apparent weight by utilizing multiple dynamic seat force and z-axis acceleration characteristics correlative of the two classifications, and determining overall confidence levels in favor of each classification. While the present invention has been described with respect to the illustrated embodiments, it is recognized that numerous modifications and variations in addition to those mentioned herein will occur to those skilled in the art. Accordingly, it is intended that the invention not be limited to the disclosed embodiment, but that it have the full scope permitted by the language of the following claims.

The invention claimed is:

1. A method of distinguishing between a normally seated adult and a cinched car seat in an occupant classification system for a seat of a vehicle, the method comprising the steps of:

measuring parameters during movement of said vehicle including a force applied to said seat and a z-axis acceleration of said vehicle;

determining an average of the measured seat force;

determining one or more dynamic characteristics correlative of a normally seated adult occupant of said seat based on said measured parameters;

determining one or more dynamic characteristics correlative of a cinched car seat occupant of said seat based on said measured parameters;

computing a first overall confidence level in favor of a normally seated adult occupant based on the average seat force and the dynamic characteristics correlative of a normally seated adult occupant;

computing a second overall confidence level in favor of a cinched car seat occupant based on the average seat force and the dynamic characteristics correlative of a cinched car seat occupant;

determining that a normally seated adult occupant is present if the first overall confidence level is greater than the second overall confidence level; and determining that a cinched child seat is present if the second overall confidence level is greater than the first overall confidence level.

2. The method of claim 1, including the steps of:

assigning confidence levels to the average seat force in favor of a normally seated adult occupant and to each of the dynamic characteristics correlative of a normally seated adult occupant; and computing said first overall confidence level based on the assigned confidence levels.

3. The method of claim 2, where there are at least two dynamic characteristics correlative of a normally seated adult occupant and the method includes the steps of:

computing an average of the confidence levels assigned to said at least two dynamic characteristics; and computing said first overall confidence level based on the computed average and the confidence level assigned to said average seat force.

4. The method of claim 1, including the steps of:

assigning confidence levels to the average seat force in favor of a cinched car seat occupant and to each of the dynamic characteristics correlative of a cinched car seat occupant; and computing said second overall confidence level based on the assigned confidence levels.

5. The method of claim 4, where there are at least two dynamic characteristics correlative of a cinched car seat occupant and the method includes the steps of:

computing an average of the confidence levels assigned to said at least two dynamic characteristics; and computing said second overall confidence level based on the computed average and the confidence level assigned to said average seat force.

6. The method of claim 1, including the steps of:

determining Mahalanobis distances for the average seat force and for said dynamic characteristics correlative of a normally seated adult occupant;

using the determined Mahalanobis distances to assign confidence levels to the average seat force in favor of a normally seated adult occupant and to each of the dynamic characteristics correlative of a normally seated adult occupant; and computing said first overall confidence level based on the assigned confidence levels.

7. The method of claim 1, including the steps of:

determining Mahalanobis distances for the average seat force and for said dynamic characteristics correlative of a cinched car seat occupant;

using the determined Mahalanobis distances to assign confidence levels to the average seat force in favor of a cinched car seat occupant and to each of the dynamic characteristics correlative of a cinched car seat occupant; and computing said second overall confidence level based on the assigned confidence levels.

8. The method of claim 1, including the steps of:

determining probability distribution function values for the average seat force and for said dynamic characteristics correlative of a normally seated adult occupant;

using the determined probability distribution function values to assign confidence levels to the average seat force in favor of a normally seated adult occupant and to each of the dynamic characteristics correlative of a normally seated adult occupant; and computing said first overall confidence level based on the assigned confidence levels.

9. The method of claim 1, including the steps of:

determining probability distribution function values for the average seat force and for said dynamic characteristics correlative of a cinched car seat occupant;

using the determined probability distribution function values to assign confidence levels to the average seat force in favor of a cinched car seat occupant and to each of the dynamic characteristics correlative of a cinched car seat occupant; and computing said second overall confidence level based on the assigned confidence levels.

10. The method of claim 1, including the steps of:

determining quality loss function values for the average seat force and for said dynamic characteristics correlative of a normally seated adult occupant;

using the determined quality loss function values to assign confidence levels to the average seat force in favor of a normally seated adult occupant and to each of the dynamic characteristics correlative of a normally seated adult occupant; and computing said first overall confidence level based on the assigned confidence levels.

11. The method of claim 1, including the steps of:

determining quality loss function values for the average seat force and for said dynamic characteristics correlative of a cinched car seat occupant;

using the determined quality loss function values to assign confidence levels to the average seat force in favor of a cinched car seat occupant and to each of the dynamic characteristics correlative of a cinched car seat occupant; and computing said second overall confidence level based on the assigned confidence levels.

* * * * *